United States Patent
Omer et al.

(10) Patent No.: US 9,927,519 B1
(45) Date of Patent: Mar. 27, 2018

(54) CATEGORIZING MOTION DETECTED USING WIRELESS SIGNALS

(71) Applicant: Cognitive Systems Corp., Waterloo (CA)

(72) Inventors: Mohammad Omer, Waterloo (CA); Stephen Arnold Devison, Kitchener (CA); Yunfeng Piao, Kitchener (CA); Dustin Griesdorf, Waterloo (CA); Tajinder Manku, Waterloo (CA); Oleksiy Kravets, Petersburg (CA); Christopher Vytautas Olekas, Breslau (CA)

(73) Assignee: Cognitive Systems Corp., Waterloo, Ontario (CA)

( * ) Notice: Subject to any disclaimer, the term of this patent is extended or adjusted under 35 U.S.C. 154(b) by 0 days.

(21) Appl. No.: 15/461,125

(22) Filed: Mar. 16, 2017

(51) Int. Cl.
*G01S 13/56* (2006.01)
*G01S 13/00* (2006.01)

(52) U.S. Cl.
CPC ............ *G01S 13/56* (2013.01); *G01S 13/003* (2013.01)

(58) Field of Classification Search
CPC ........ G01S 13/003; G01S 13/02; G01S 13/50; G01S 13/52; G01S 13/56; G01S 7/02; G01S 7/41; G01S 7/415; G01S 13/58; G01S 13/583; G01S 13/584; G01S 13/88; G01S 13/95; G01S 13/951
See application file for complete search history.

(56) References Cited

U.S. PATENT DOCUMENTS

| | | | |
|---|---|---|---|
| 4,054,879 A | * | 10/1977 | Wright .................... G01S 7/415 342/192 |
| 4,649,388 A | * | 3/1987 | Atlas ...................... G01S 13/951 342/26 D |
| 4,740,045 A | | 4/1988 | Goodson |
| 5,270,720 A | | 12/1993 | Stove |

(Continued)

FOREIGN PATENT DOCUMENTS

| | | |
|---|---|---|
| CA | 2834522 | 5/2014 |
| CA | 2945702 | 8/2015 |

(Continued)

OTHER PUBLICATIONS

Canadian Intellectual Property Office, International Search Report and Written Opinion issued in International Application No. PCT/CA2016/051466 dated Mar. 14, 2017, 9 pages.

(Continued)

*Primary Examiner* — Bernarr E Gregory
(74) *Attorney, Agent, or Firm* — Henry Patent Law Firm PLLC

(57) ABSTRACT

In a general aspect, motion detected using wireless signals is categorized. In some aspects, frequency response signals are obtained. The frequency response signals are based on wireless signals that were transmitted through a space and received at a wireless sensor device over a time period. Values of a statistical parameter are determined for the time period, with the statistical parameter for the time period being based on a function applied to frequency components of the frequency response signals over the time period. A category of motion that occurred in the space during the time period is identified based on the values of the statistical parameter.

30 Claims, 7 Drawing Sheets

(56) References Cited

U.S. PATENT DOCUMENTS

| | | | |
|---|---|---|---|
| 5,696,514 | A | 12/1997 | Nathanson |
| 6,075,797 | A | 6/2000 | Thomas |
| 6,493,380 | B1 | 12/2002 | Wu |
| 6,573,861 | B1 * | 6/2003 | Hommel .................. G01S 7/415 342/192 |
| 7,047,015 | B2 | 5/2006 | Hawe |
| 7,295,109 | B2 | 11/2007 | Kobayashi |
| 7,317,419 | B2 | 1/2008 | Sugar et al. |
| 7,652,617 | B2 * | 1/2010 | Kurtz .................... G01S 13/584 342/104 |
| 7,916,066 | B1 | 3/2011 | Osterweil |
| 8,138,918 | B2 | 3/2012 | Habib |
| 8,710,984 | B2 | 4/2014 | Wilson et al. |
| 8,818,288 | B2 | 8/2014 | Patwari et al. |
| 8,836,344 | B2 | 9/2014 | Habib |
| 9,030,321 | B2 | 5/2015 | Breed |
| 9,143,413 | B1 | 9/2015 | Manku |
| 9,143,968 | B1 | 9/2015 | Manku |
| 9,523,760 | B1 | 12/2016 | Kravets et al. |
| 9,524,628 | B1 | 12/2016 | Omer et al. |
| 9,551,784 | B2 | 1/2017 | Katuri |
| 9,584,974 | B1 | 2/2017 | Omer et al. |
| 9,743,294 | B1 | 8/2017 | Omer et al. |
| 2003/0108119 | A1 | 6/2003 | Mohebbi et al. |
| 2005/0055568 | A1 | 3/2005 | Agrawala |
| 2005/0083199 | A1 | 4/2005 | Hall |
| 2006/0217132 | A1 | 9/2006 | Drummond-Murray et al. |
| 2008/0119130 | A1 | 5/2008 | Sinha |
| 2008/0240008 | A1 | 10/2008 | Backes et al. |
| 2008/0303655 | A1 | 12/2008 | Johnson |
| 2009/0040952 | A1 | 2/2009 | Cover et al. |
| 2009/0062696 | A1 | 3/2009 | Nathan et al. |
| 2010/0026490 | A1 | 2/2010 | Butler et al. |
| 2010/0315284 | A1 | 12/2010 | Trizna |
| 2011/0130092 | A1 | 6/2011 | Yun |
| 2012/0009882 | A1 | 1/2012 | Patwari et al. |
| 2012/0115512 | A1 | 5/2012 | Grainger et al. |
| 2012/0146788 | A1 | 6/2012 | Wilson |
| 2012/0184296 | A1 | 7/2012 | Milosiu |
| 2012/0212366 | A1 | 8/2012 | Alalusi |
| 2013/0005280 | A1 | 1/2013 | Leung et al. |
| 2013/0090151 | A1 | 4/2013 | Ngai et al. |
| 2013/0162459 | A1 | 6/2013 | Aharony et al. |
| 2013/0283256 | A1 | 10/2013 | Proud |
| 2014/0004874 | A1 | 1/2014 | Schwartz |
| 2014/0015706 | A1 | 1/2014 | Ishihara |
| 2014/0128778 | A1 | 5/2014 | Chan et al. |
| 2014/0135042 | A1 | 5/2014 | Buchheim |
| 2014/0140231 | A1 | 5/2014 | Haiut |
| 2014/0247179 | A1 | 9/2014 | Furuskog |
| 2014/0286380 | A1 | 9/2014 | Prager et al. |
| 2015/0043377 | A1 | 2/2015 | Cholas |
| 2015/0078295 | A1 | 3/2015 | Mandyam et al. |
| 2015/0098377 | A1 | 4/2015 | Amini |
| 2015/0195100 | A1 | 7/2015 | Imes et al. |
| 2015/0212205 | A1 | 7/2015 | Shpater |
| 2015/0245164 | A1 | 8/2015 | Merrill |
| 2015/0338507 | A1 | 11/2015 | Oh |
| 2016/0018508 | A1 | 1/2016 | Chen et al. |
| 2016/0183059 | A1 | 6/2016 | Nagy et al. |
| 2016/0187475 | A1 | 6/2016 | Horng et al. |
| 2016/0210838 | A1 | 7/2016 | Yan |
| 2016/0241999 | A1 | 8/2016 | Chin |
| 2017/0146656 | A1 | 5/2017 | Belsley et al. |
| 2017/0309146 | A1 | 10/2017 | MacKenzie et al. |
| 2017/0343658 | A1 | 11/2017 | Ramirez et al. |

FOREIGN PATENT DOCUMENTS

| | | |
|---|---|---|
| WO | 2014021574 A1 | 2/2014 |
| WO | 2014201574 A1 | 12/2014 |
| WO | 2015/168700 A1 | 11/2015 |

OTHER PUBLICATIONS

"Apple Insider; "Intel to reportedly supply LTD chips for 2016 iPhone"; http://appleinsider.com/articles/15/03/11/intel-to-reportedly-supply-ltd-chips-for-2016-iphone; 2 pages; May 15, 2016."

"CEVA; "CEVA's DSP Cores Power the World's Leading Mobile Broadband and M2M Applications"; http://www.ceva-dsp.com/Mobile-Broadband; 3 pages; May 15, 2016."

"Japan Radio Co., Ltd; "26GHz FWA—Technology"; http://www.jrc.co.jp/eng/product/Ineup/26ghz_wireless_ip_access_system/tech.html; 3 pages; May 15, 2016."

"quora.com; "What is the function of the baseband processor in wireless devices?"; https://ww.quora.com/What-is-the-function-of-the-baesband-processor-in-wireless-devices; 2 pages; May 15, 2016."

"Wikipedia; "Baseband processor"; rhttps://en.wikipedia.org/wiki/Bandband_processor; 2 pages; version dated Apr. 20, 2016."

Canadian Intellectual Property Office, International Search Report and Written Opinion for International Application No. PCT/CA2017/050037 dated Apr. 13, 2017, 12 pages.

Canadian Intellectual Property Office, International Search Report and Written Opinion issued International Application No. PCT/CA2016/051228 on Apr. 25, 2017, 8 pages.

NETGEAR, "N600 Wifi Cable Modem Router, Model C3700 User Manual", https://web.archive.org/web/20150121182848/http://www.downloads.netgear.com/files/GDC/C3700_UM_21Aug2014.pdf (archive of URL http://www.downloads.netgear.com/files/GDC/C3700_UM_21Aug2014.pdf captured on Jan. 21, 2015, 101 pages.

OPENWRT, "Wireless Configuration", https://web.archive.org/web/20140402033233/http://wiki.openwrt.org/doc/uci/wireless (capture of URL http://wiki.openwrt.org/doc/uci/wireless on Apr. 2, 2014), 22 pages.

USPTO, Final Office Action received in U.S. Appl. No. 15/176,489 dated Jun. 23, 2017, 23 pages.

USPTO, Notice of Allowance issued in U.S. Appl. No. 15/460,643 dated Jun. 12, 2017, 34 pages.

USPTO, Non-Final Office Action issued in U.S. Appl. No. 15/691,195 dated Nov. 15, 2017, 17 pgs.

USPTO, Non-Final Office Action received in U.S. Appl. No. 15/799,768 dated Dec. 13, 2017, 7 pgs.

USPTO, Non-Final Office Action dated Dec. 28, 2017, in U.S. Appl. No. 15/789,761, 31 pgs.

Youssef, Moustafa, et al., "Challenges: Device-free Passive Localization for Wireless Environments", Mobicom 07 Proceedings of the 13th Annual ACM International Conference on Mobile Computing and Networking, Sep. 2007, 31 pgs.

USPTO; Restriction Requirement dated Jan. 23, 2018, in U.S. Appl. No. 15/706,295.

USPTO, Notice of Allowance dated Jan. 10, 2018, in U.S. Appl. No. 15/803,189, 28 pgs.

USPTO; Non-Final Office Action dated Jan. 23, 2018, in U.S. Appl. No. 15/789,815, 35 pgs.

Wei, et al., "Radio-based Device-free Activity Recognition with Radio Frequency Interference", IPSN '15 Proceedings of the 14th International Conference on Information Processing in Sensor Networks, dated Apr. 13-16, 2015, 12 pgs.

Zheng, et al., "Detecting Radio Frequency Interference for CSI Measurements on COTS WiFi Devices", IEEE ICC 2017, Ad-Hoc and Sensor Networking Symposium, May 2017, 6 pgs.

* cited by examiner

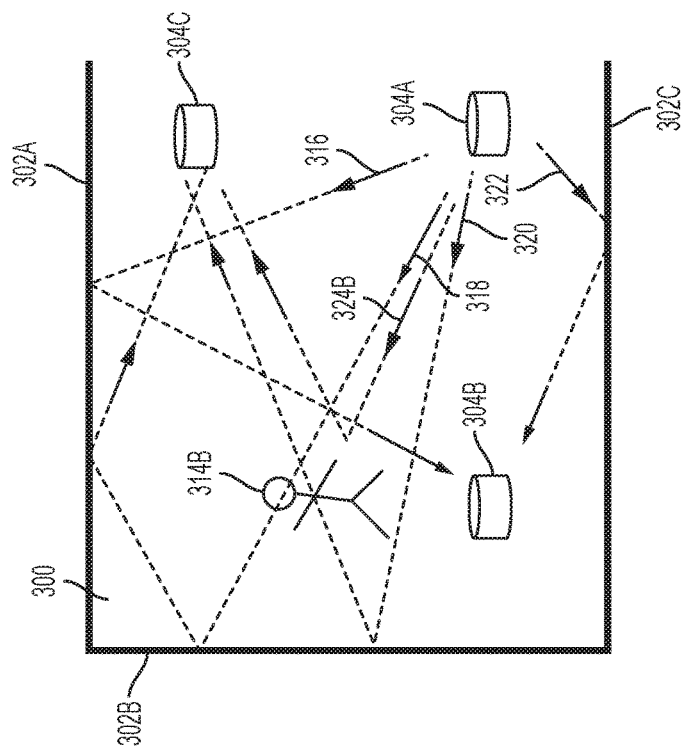
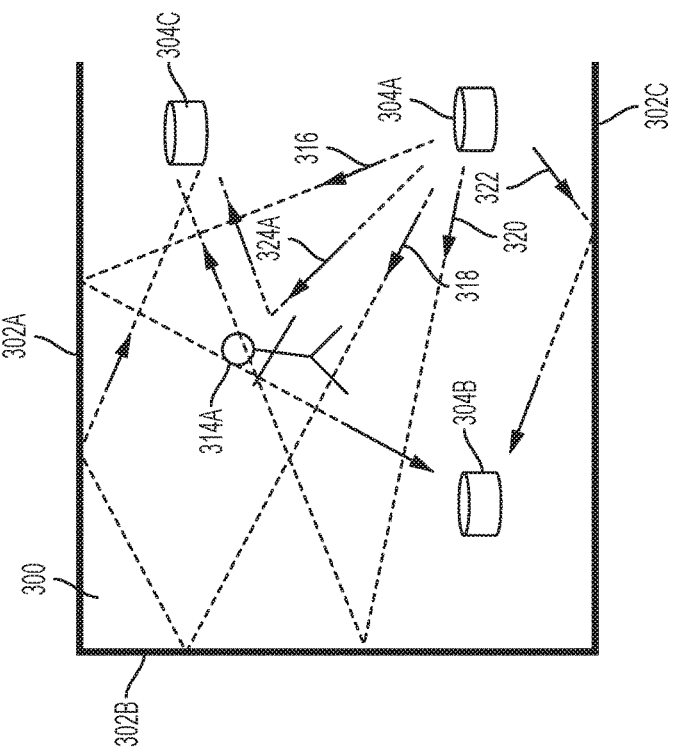
FIG. 3A
FIG. 3B

US 9,927,519 B1

CATEGORIZING MOTION DETECTED USING WIRELESS SIGNALS

BACKGROUND

The following description relates to motion detection.

Motion detection systems have been used to detect movement, for example, of objects in a room or an outdoor area. In some example motion detection systems, infrared or optical sensors are used to detect movement of objects in the sensor's field of view. Motion detection systems have been used in security systems, automated control systems and other types of systems.

DESCRIPTION OF DRAWINGS

FIGS. 3A and 3B are diagrams showing example signals communicated between wireless sensor devices.

DETAILED DESCRIPTION

In some aspects of what is described here, motion in a space can be detected and categorized based on wireless signals transmitted through the space. For example, motion may be categorized based on statistical parameters of frequency response signals derived from the wireless signals. For example, the statistical parameters used to categorize the motion may include the maximum, minimum, mean, standard deviation, or another statistical function of one or more frequency components of the frequency response signals.

In some instances, for example, in a learning mode, statistical parameters of signals are analyzed to detect signatures of distinct categories of motion. For example, statistical parameters associated with wireless signals transmitted during two distinct time periods can be compared to identify a signature of the type of motion (e.g., motion by a human) that know to have occurred during one or more of the time periods. In some instances, a pattern of values (e.g., a particular range of values, a correlation between values, or a repeating set of values) observed exclusively during a particular time period is associated (e.g., in a motion detection database) with the category of motion known to have occurred exclusively during the particular time period.

In some instances, for example, in a motion detection mode, statistical parameters of signals are analyzed to identify a category of motion that occurred based on a known signature of the category. For example, the pattern of values associated with a category of motion can be used as a reference value to identify the category of motion when new wireless signals are received. For instance, values of the statistical parameter can be determined for the newly-received wireless signals and compared with the reference values (e.g., in the motion detection database) to identify that the category of motion occurred in the space traversed by the newly-received wireless signals.

Aspects of the present disclosure may provide one or more advantages in some instances. For example, categories of motion may be identified based on wireless signals without requiring a field of view like infrared or optical sensors. In addition, categories of motion may be identified accurately, causing fewer false-positive detections of motion in a space. In some cases, when a category of motion is accurately detected, an intelligent response to the motion can be initiated automatically. For instance, a security system may be activated in response to detecting motion associated with an intruder but not in response to detecting motion associated with a pet or fan.

Figure 1A:
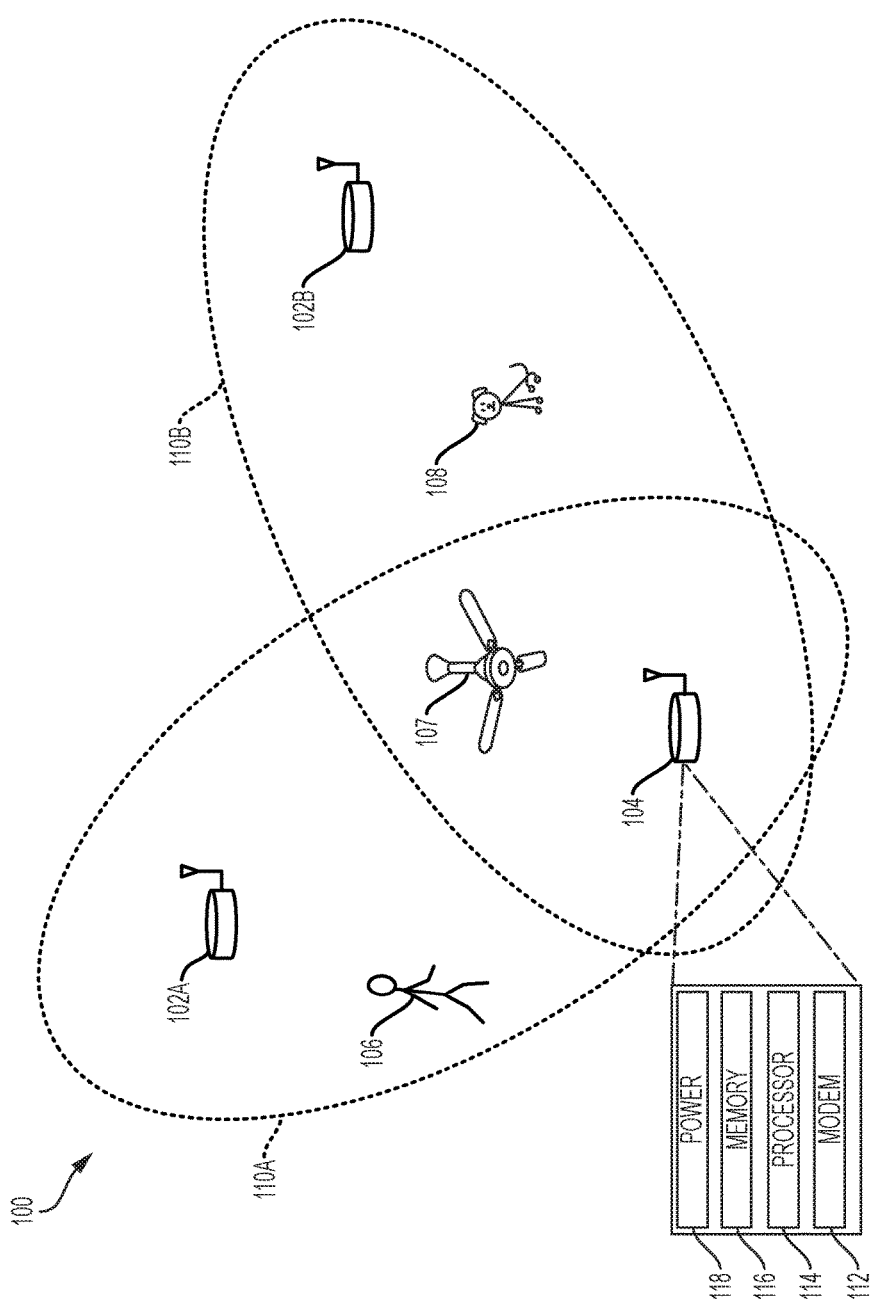
FIG. 1A is a diagram showing an example wireless communication system.

FIG. 1A is a diagram showing an example wireless communication system 100. The example wireless communication system 100 includes three wireless devices—a first wireless device 102A, a second wireless device 102B, and a motion detector device 104. The example wireless communication system 100 may include additional wireless devices and other components (e.g., additional motion detector devices, additional wireless devices, one or more network servers, network routers, network switches, cables, or other communication links, etc.).

The example wireless devices 102A, 102B can operate in a wireless network, for example, according to a wireless network standard or another type of wireless communication protocol. For example, the wireless network may be configured to operate as a Wireless Local Area Network (WLAN), a Personal Area Network (PAN), a metropolitan area network (MAN), or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., BLUETOOTH®, Near Field Communication (NFC), Zig-Bee), millimeter wave communications, and others.

In some implementations, the wireless devices 102A, 102B may be configured to communicate in a cellular network, for example, according to a cellular network standard. Examples of cellular networks include networks configured according to 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); and others.

In the example shown in FIG. 1A, the wireless devices 102A, 102B can be, or they may include, standard wireless network components; for example, a conventional Wi-Fi access point or another type of wireless access point (WAP) may be used in some cases. In some cases, another type of standard or conventional Wi-Fi transmitter device may be used. In some examples, the wireless devices 102A, 102B each include a modem and other components such as, for example, a power unit, a memory, and wired communication ports. In some implementations, the first wireless device 102A and the second wireless device 102B are the same type of device. In some implementations, the first wireless device 102A and the second wireless device 102B are two different types of devices (e.g., wireless devices for two different types of wireless networks, or two different types of wireless devices for the same wireless network).

The example motion detector device 104 includes a modem 112, a processor 114, a memory 116, and a power unit 118. The motion detector device 104 may include additional or different components, and they may be configured to operate as shown in FIG. 1A or in another manner. In some implementations, the modem 112, processor 114, memory 116, and power unit 118 are housed together in a common housing or other assembly. In some implementations, one or more of the components can be housed separately, for example, in a separate housing or other assembly.

The example modem 112 can communicate (receive, transmit, or both) wireless signals. For example, the modem 112 may be configured to communicate radio frequency signals formatted according to a wireless communication standard. The modem 112 may be implemented as the example wireless network modem 112 shown in FIG. 1B, or may be implemented in another manner, for example, with other types of components or subsystems. In some implementations, the example modem 112 includes a radio subsystem and a baseband subsystem. In some cases, the baseband subsystem and radio subsystem can be implemented on a common chip or chipset, or they may be implemented in a card or another type of assembled device. The baseband subsystem can be coupled to the radio subsystem, for example, by leads, pins, wires, or other types of connections.

In some cases, a radio subsystem in the modem 112 can include one or more antennas and radio frequency circuitry. The radio frequency circuitry can include, for example, circuitry that filters, amplifies or otherwise conditions analog signals, circuitry that up-converts baseband signals to RF signals, circuitry that down-converts RF signals to baseband signals, etc. Such circuitry may include, for example, filters, amplifiers, mixers, a local oscillator, etc. The radio subsystem can be configured to communicate radio frequency wireless signals on the wireless communication channels. As an example, the radio subsystem may include the radio chip 113, the RF front end 115, and antenna 117 shown in FIG. 1B. A radio subsystem may include additional or different components. In some implementations, the radio subsystem can be or include the radio electronics (e.g., RF front end, radio chip, or analogous components) from a conventional modem, for example, from a Wi-Fi modem, pico base station modem, etc.

In some cases, a baseband subsystem in the modem 112 can include, for example, digital electronics configured to process digital baseband data. As an example, the baseband subsystem may include the baseband chip 111 shown in FIG. 1B. A baseband subsystem may include additional or different components. In some cases, the baseband subsystem may include a digital signal processor (DSP) device or another type of processor device. In some cases, the baseband system includes digital processing logic to operate the radio subsystem, to communicate wireless network traffic through the radio subsystem, to detect motion based on motion detection signals received through the radio subsystem or to perform other types of processes. For instance, the baseband subsystem may include one or more chips, chipsets, or other types of devices that are configured to encode signals and deliver the encoded signals to the radio subsystem for transmission, or to identify and analyze data encoded in signals from the radio subsystem (e.g., by decoding the signals according to a wireless communication standard, by processing the signals according to a motion detection process, or otherwise).

In some instances, the radio subsystem in the example modem 112 receives baseband signals from the baseband subsystem, up-converts the baseband signals to radio frequency signals, and wirelessly transmits the radio frequency signals (e.g., through an antenna). In some instances, the radio subsystem in the example modem 112 wirelessly receives radio frequency signals (e.g., through an antenna), down-converts the radio frequency signals to baseband signals, and sends the baseband signals to the baseband subsystem. The signals exchanged between the radio subsystem and the baseband subsystem may be digital or analog signals. In some examples, the baseband subsystem includes conversion circuitry (e.g., a digital-to-analog converter, an analog-to-digital converter) and exchanges analog signals with the radio subsystem. In some examples, the radio subsystem includes conversion circuitry (e.g., a digital-to-analog converter, an analog-to-digital converter) and exchanges digital signals with the baseband subsystem.

In some cases, the baseband subsystem of the example modem 112 can communicate wireless network traffic (e.g., data packets) in the wireless communication network through the radio subsystem on one or more network traffic channels. The baseband subsystem of the modem 112 may also transmit or receive (or both) motion detection signals (e.g., motion detection packets) through the radio subsystem on a motion detection channel. In some instances, the baseband subsystem generates the motion detection signals for transmission, for example, in order to probe a space for motion. In some instances, the baseband subsystem processes received motion detection signals, for example, to detect motion of an object in a space.

The example processor 114 can execute instructions, for example, to generate output data based on data inputs. The instructions can include programs, codes, scripts, or other types of data stored in memory. Additionally or alternatively, the instructions can be encoded as pre-programmed or re-programmable logic circuits, logic gates, or other types of hardware or firmware components. The processor 114 may be or include a general purpose microprocessor, as a specialized co-processor or another type of data processing apparatus. In some cases, the processor 114 performs high level operation of the motion detection device 104. For example, the processor 114 may be configured to execute or interpret software, scripts, programs, functions, executables, or other modules stored in the memory 116. In some implementations, the processor 114 may be included in the modem 112.

The example memory 116 can include computer-readable media, for example, a volatile memory device, a non-volatile memory device, or both. The memory 116 can include one or more read-only memory devices, random-access memory devices, buffer memory devices, or a combination of these and other types of memory devices. In some instances, one or more components of the memory can be integrated or otherwise associated with another component of the motion detection device 104.

The example power unit 118 provides power to the other components of the motion detector device 104. For example, the other components may operate based on electrical power provided by the power unit 118 through a voltage bus or other connection. In some implementations, the power unit 118 includes a battery or a battery system, for example, a rechargeable battery. In some implementations, the power unit 118 includes an adapter (e.g., and AC adapter) that receives an external power signal (from an external source) and coverts the external power signal to an internal power signal conditioned for a component of the motion detector device 104. The power unit 118 may include other components or operate in another manner.

In the example shown in FIG. 1A, the wireless devices 102A, 102B transmit wireless signals according to a wireless network standard. For instance, wireless devices 102A, 102B may broadcast wireless signals (e.g., beacon signals, status signals, etc.), or they may send wireless signals addressed to other devices (e.g., a user equipment, a client device, a server, etc.), and the other devices (not shown) as well as the motion detector device 104 may receive the wireless signals transmitted by the wireless devices 102A, 102B. In some cases, the wireless signals transmitted by the wireless devices 102A, 102B are repeated periodically, for example, according to a wireless communication standard or otherwise.

In the example shown, the motion detector device 104 processes the wireless signals from the wireless devices 102A, 102B to identify categories of motion occurring in a space accessed by the wireless signals. For example, the motion detector device 104 may perform the example processes 500 and 600 of FIGS. 5 and 6, respectively, or another type of process for identifying categories of motion. The space accessed by the motion detection signals can be an indoor or outdoor space, which may include, for example, one or more fully or partially enclosed areas, an open area without enclosure, etc. The space can be or can include an interior of a room, multiple rooms, a building, or the like. In some cases, the wireless communication system 100 can be modified, for instance, such that the motion detector device 104 can transmit wireless signals and the wireless devices 102A, 102B can processes the wireless signals from the motion detector device 104 to detect motion.

The wireless signals used for motion detection can include, for example, a beacon signal (e.g., Bluetooth Beacons, Wi-Fi Beacons, other wireless beacon signals) or another standard signal generated for other purposes according to a wireless network standard. In some examples, the wireless signals propagate through an object (e.g., a wall) before or after interacting with a moving object, which may allow the moving object's movement to be detected without an optical line-of-sight between the moving object and the transmission or receiving hardware. The motion detection data generated by the motion detector device 104 may be communicated to another device or system, such as a security system, that may include a control center for monitoring movement within a space, such as a room, building, outdoor area, etc.

In some implementations, the wireless devices 102A and 102B can be modified to include a separate transmission channel (e.g., a frequency channel or coded channel) that transmits signals with a header and a payload that the motion detector device 104 can use for motion sensing. For example, the modulation applied to the payload and the type of data or data structure in the payload may be known by the motion detector device 104, which may reduce the amount of processing that the motion detector device 104 performs for motion sensing. The header may include additional information such as, for example, an indication of whether motion was detected by another device in the communication system 100, an indication of the modulation type, etc.

In the example shown in FIG. 1A, the wireless communication link between the motion detector device 104 and the first wireless device 102A can be used to probe a first motion detection field 110A, and the wireless communication link between the motion detector device 104 and the second wireless device 102A can be used to probe a second motion detection field 110B. In some instances, when an object moves in the space accessed by the wireless signals, the motion detector device 104 detects the motion and identifies a category of the motion. For example, when the person 106 shown in FIG. 1A moves in the first motion detection field 110A, the motion detector device 104 may detect the motion based on the wireless signals transmitted by the first wireless device 102A, and identify the motion as motion by a human. As another example, when the fan 107 shown in FIG. 1A moves in the overlap area of the first motion detection field 110A and the second motion detection field 110B, the motion detector device 104 may detect the motion based on the wireless signals transmitted by the first wireless device 102A, the second wireless device 102B, or both, and identify the motion as motion by an inorganic object. As another example, when the dog 108 shown in FIG. 1A moves in the second motion detection field 110B, the motion detector device 104 may detect the motion based on the wireless signals transmitted by the second wireless device 102A, and identify the motion as motion by an animal.

In some instances, the motion detection fields 110A, 110B can include, for example, air, solid materials, liquids, or another medium through which wireless electromagnetic signals may propagate. In the example shown in FIG. 1A, the first motion detection field 110A provides a wireless communication channel between the first wireless device 102A and the motion detector device 104, and the second motion detection field 110B provides a wireless communication channel between the second wireless device 102B and the motion detector device 104. In some aspects of operation, wireless signals transferred through a wireless communication channel are used to detect movement of an object in the wireless communication channel. The objects can be any type of static or moveable object, and can be living or inanimate. For example, the object can be a human (e.g., the person 106 shown in FIG. 1A), an animal (e.g., the dog 108 shown in FIG. 1A), an inorganic object (e.g., the fan 107 shown in FIG. 1A, or another device, apparatus, or assembly), an object that defines all or part of the boundary of a space (e.g., a wall, door, window, etc.), or another type of object.

Figure 1B:
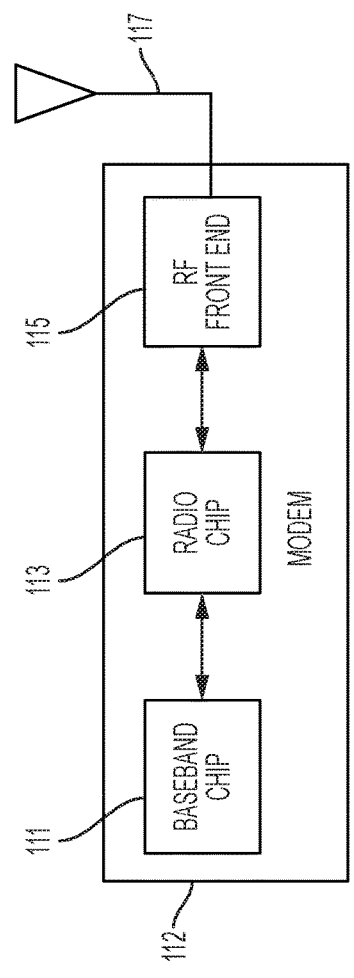
FIG. 1B is a diagram showing an example modem of a motion detector device.

FIG. 1B is a diagram showing an example wireless network modem 112. In some examples, the wireless network modem 112 can be implemented as a card, a chip, a chipset, or another type of device. A modem may generally include a radio subsystem and a baseband subsystem, along with software or firmware for one or more wireless communication standards or other protocols. In some cases, a modem includes hardware, software, or firmware (or combinations thereof) to support multiple wireless communication standards (e.g., 3G and LTE).

The example wireless network modem 112 shown in FIG. 1B may be operated as described above. For example, the wireless network modem 112 may communicate on the wireless communication channels (e.g., network traffic channels and a motion detection channel), and detect motion of object, for example, by processing motion detection signals. In some instances, the example wireless network modem 112 may operate in another manner.

The example wireless network modem 112 shown in FIG. 1B includes a baseband chip 111, a radio chip 113 and a radio frequency (RF) front end 115. The wireless network modem 112 may include additional or different features, and the components may be arranged as shown or in another manner. In some implementations, the baseband chip 111 includes the components and performs the operations of the baseband subsystem described with respect to the example modem 112 shown in FIG. 1A. In some implementations, the baseband chip 111 can process in-phase and quadrature signals (I and Q signals) from the radio chip 113 to extract data from received wireless signals. The baseband chip 111 may control the radio chip 113 or perform other operations. In some cases, the baseband chip 111 can be implemented as a digital signal processor (DSP) or another type of data processing apparatus. In some instances, the baseband chip 111 can include one or more data processing units, such as, for example, a central processing unit (CPU), a graphics processing unit (GPU), or another type of data processing unit.

In some implementations, the radio chip 113 and the RF front end 115 include the components and perform the operations of the radio subsystem described with respect to the example modem 112 shown in FIG. 1A. In some implementations, the radio chip 113 can produce in-phase and quadrature signals (I and Q signals), for example, in digital or analog format, based on received wireless signals. In some implementations, the RF front end 115 can include one or more filters, RF switches, couplers, RF gain chips or other components that condition radio frequency signals for transmission or processing.

Figure 2:
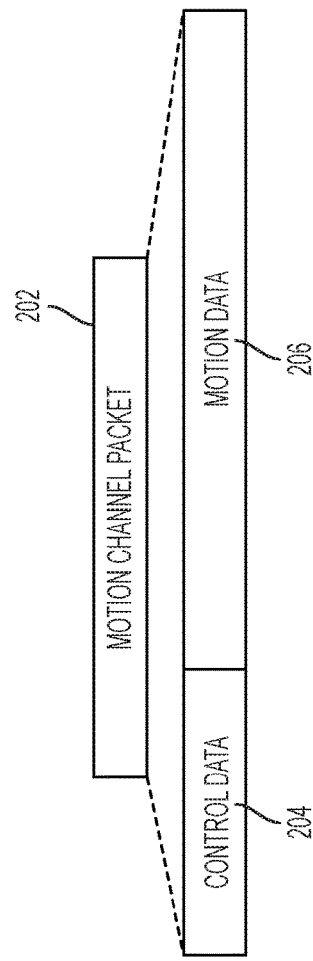
FIG. 2 is a diagram showing an example motion channel packet.

FIG. 2 is a diagram showing an example motion channel packet 202. The example motion channel packet 202 can be transmitted, for example, in a wireless network system in order to monitor for motion in a space. In some examples, the motion channel packet 202 is transmitted in the form of a motion detection signal on a motion detection channel in a wireless communication network. For instance, the motion channel packet 202 can include binary data that is converted to an analog signal, up-converted to radio frequency, and wirelessly transmitted by an antenna.

The example motion channel packet 202 shown in FIG. 2 includes control data 204 and a motion data 206. A motion channel packet 202 may include additional or different features, and may be formatted in another manner. In the example shown, the control data 204 may include the type of control data that would be included in a conventional data packet. For instance, the control data 204 may include a preamble indicating the type of information contained in the motion channel packet 202, an identifier of a wireless device transmitting the motion channel packet 202, a MAC address of a wireless device transmitting the motion channel packet 202, a transmission power, etc. The motion data 206 is the payload of the example motion channel packet 202. In some implementations, the motion data 206 can be or include, for example, a pseudorandom code or another type of reference signal. In some implementations, the motion data 206 can be or include, for example, a beacon signal broadcast by a wireless network system.

In an example, the motion channel packet 202 is transmitted by a wireless device (e.g., the wireless device 102A shown in FIG. 1A) and received at a motion detection device (e.g., the detection device 104 shown in FIG. 1A). In some cases, the control data 204 changes with each transmission, for example, to indicate the time of transmission or updated parameters. The motion data 206 can remain unchanged in each transmission of the motion channel packet 202. The motion detection device can process the received signals based on each transmission of the motion channel packet 202, and analyze the motion data 206 for changes. For instance, changes in the motion data 206 may indicate movement of an object in a space accessed by the wireless transmission of the motion channel packet 202. The motion data 206 can then be processed, for example, to generate a response to the detected motion.

FIGS. 3A and 3B are diagrams showing example motion detection signals communicated between wireless sensor devices 304A, 304B, 304C. The wireless sensor devices 304A, 304B, 304C can be, for example, the wireless devices 102A, 102B and motion detection device 104 shown in FIG. 1A, or other types of wireless sensor devices. The example wireless sensor devices 304A, 304B, 304C transmit wireless signals in a space 300. The example space 300 can be completely or partially enclosed or open at one or more boundaries of the space. The space 300 can be or can include an interior of a room, multiple rooms, a building, an indoor area, outdoor area, or the like. A first wall 302A, a second wall 302B, and a third wall 302C at least partially enclose the space 300 in the example shown.

In the example shown in FIGS. 3A and 3B, the first wireless sensor device 304A is operable to transmit motion detection signals repeatedly (e.g., periodically, intermittently, at random intervals, etc.). The second and third wireless sensor devices 304B, 304C are operable to receive the transmitted motion detection signals. The wireless sensor devices 304B, 304C each have a modem (e.g., the modem 112 shown in FIG. 1B) that is configured to identify categories of motion in the space 300, for example, using processes 500 and 600 of FIGS. 5 and 6.

As shown, an object is in a first position 314A in FIG. 3A, and the object has moved to a second position 314B in FIG. 3B. In FIGS. 3A and 3B, the moving object in the space 300 is represented as a human, but the moving object can be another type of object. For example, the moving object can be an animal, an inorganic object (e.g., a system, device, apparatus, or assembly), an object that defines all or part of the boundary of the space 300 (e.g., a wall, door, window, etc.), or another type of object.

As shown in FIGS. 3A and 3B, multiple example paths of the motion detection signal transmitted from the first wireless sensor device 304A are illustrated by dashed lines. Along a first signal path 316, the motion detection signal is transmitted from the first wireless sensor device 304A and reflected off the first wall 302A toward the second wireless sensor device 304B. Along a second signal path 318, the motion detection signal is transmitted from the first wireless sensor device 304A and reflected off the second wall 302B and the first wall 302A toward the third wireless sensor device 304C. Along a third signal path 320, the motion detection signal is transmitted from the first wireless sensor device 304A and reflected off the second wall 302B toward the third wireless sensor device 304C. Along a fourth signal path 322, the motion detection signal is transmitted from the first wireless sensor device 304A and reflected off the third wall 302C toward the second wireless sensor device 304B.

In FIG. 3A, along a fifth signal path 324A, the motion detection signal is transmitted from the first wireless sensor device 304A and reflected off the object at the first position 314A toward the third wireless sensor device 304C. Between FIGS. 3A and 3B, a surface of the object moves from the first position 314A to a second position 314B in the space 300 (e.g., some distance away from the first position 314A). In FIG. 3B, along a sixth signal path 324B, the motion detection signal is transmitted from the first wireless sensor device 304A and reflected off the object at the second position 314B toward the third wireless sensor device 304C. The sixth signal path 324B depicted in FIG. 3B is longer than the fifth signal path 324A depicted in FIG. 3A due to the movement of the object from the first position 314A to the second position 314B. In some examples, a signal path can be added, removed, or otherwise modified due to movement of an object in a space.

The example motion detection signals shown in FIGS. 3A and 3B may experience attenuation, frequency shifts, phase shifts, or other effects through their respective paths and may have portions that propagate in another direction, for example, through the walls 302A, 302B, and 302C. In some examples, the motion detection signals are radio frequency (RF) signals; or the motion detection signals may include other types of signals.

In the example shown in FIGS. 3A and 3B, the first wireless sensor device 304A repeatedly transmits a motion detection signal. In particular, FIG. 3A shows the motion detection signal being transmitted from the first wireless sensor device 304A at a first time, and FIG. 3B shows the same signal being transmitted from the first wireless sensor device 304A at a second, later time. The transmitted signal can be transmitted continuously, periodically, at random or intermittent times or the like, or a combination thereof. The transmitted signal can have a number of frequency components in a frequency bandwidth. The transmitted signal can be transmitted from the first wireless sensor device 304A in an omnidirectional manner, in a directional manner or otherwise. In the example shown, the motion detection signals traverse multiple respective paths in the space 300, and the signal along each path may become attenuated due to path losses, scattering, reflection, or the like and may have a phase or frequency offset.

As shown in FIGS. 3A and 3B, the signals from various paths 316, 318, 320, 322, 324A, and 324B combine at the third wireless sensor device 304C and the second wireless sensor device 304B to form received signals. Because of the effects of the multiple paths in the space 300 on the transmitted signal, the space 300 may be represented as a transfer function (e.g., a filter) in which the transmitted signal is input and the received signal is output. When an object moves in the space 300, the attenuation or phase offset affected upon a signal in a signal path can change, and hence, the transfer function of the space 300 can change. Assuming the same motion detection signal is transmitted from the first wireless sensor device 304A, if the transfer function of the space 300 changes, the output of that transfer function—the received signal—will also change. A change in the received signal can be used to detect movement of an object.

Mathematically, a transmitted signal f(t) transmitted from the first wireless sensor device 304A may be described according to Equation (1):

$$f(t) = \sum_{n=-\infty}^{\infty} c_n e^{j\omega_n t} \quad (1)$$

where $\omega_n$ represents the frequency of $n^{th}$ frequency component of the transmitted signal, $c_n$ represents the complex coefficient of the $n^{th}$ frequency component, and t represents time. With the transmitted signal f(t) being transmitted from the first wireless sensor device 304A, an output signal $r_k(t)$ from a path k may be described according to Equation (2):

$$r_k(t) = \sum_{n=-\infty}^{\infty} \alpha_{n,k} c_n e^{j(\omega_n t + \phi_{n,k})} \quad (2)$$

where $\alpha_{n,k}$ represents an attenuation factor (e.g., due to scattering, reflection, and path losses) for the $n^{th}$ frequency component along path k, and $\varphi_{n,k}$ represents the phase of the signal for $n^{th}$ frequency component along path k. Then, the received signal R at a wireless sensor device can be described as the summation of all output signals $r_k(t)$ from all paths to the wireless sensor device, which is shown in Equation (3):

$$R = \sum_k r_k(t) \quad (3)$$

Substituting Equation (2) into Equation (3) renders the following Equation (4):

$$R = \sum_k \sum_{n=-\infty}^{\infty} (\alpha_{n,k} e^{j\phi_{n,k}}) c_n e^{j\omega_n t} \quad (4)$$

The received signal R at a wireless sensor device can then be analyzed. The received signal R at a wireless sensor device can be transformed to the frequency domain, for example, using a Fast Fourier Transform (FFT) or another type of algorithm. The transformed signal can represent the received signal R as a series of n complex values, one for each of the respective frequency components (at then frequencies $\omega_n$). For a frequency component at frequency $\omega_n$, a complex value $H_n$ may be represented as follows in Equation (5):

$$H_n = \sum_k c_n \alpha_{n,k} e^{j\phi_{n,k}}. \quad (5)$$

The complex value $H_n$ for a given frequency component $\omega_n$ indicates a relative magnitude and phase offset of the received signal at that frequency component $\omega_n$. In some implementations, the complex value $H_n$ represents a frequency component of a frequency response signal H that is based on the received signal R.

With the first wireless sensor device 304A repeatedly (e.g., at least twice) transmitting the transmitted signal f(t) and a respective wireless sensor device 304B, 304C receiving and analyzing a respective received signal R, the respective wireless sensor device 304B, 304C can determine when a change in a complex value $Y_n$ (e.g., a magnitude or phase) for a given frequency component $\omega_n$ occurs that is indicative of movement of an object within the space 300. For example, a change in a complex value $Y_n$ for a given frequency component $\omega_n$ may exceed a predefined threshold to indicate movement. In some examples, small changes in one or more complex values $Y_n$ may not be statistically significant, but may only be indicative of noise or other effects.

In some examples, transmitted and received signals are in an RF spectrum, and signals are analyzed in a baseband bandwidth. For example, a transmitted signal may include a baseband signal that has been up-converted to define a transmitted RF signal, and a received signal may include a received RF signal that has been down-converted to a baseband signal. Because the received baseband signal is embedded in the received RF signal, effects of movement in the space (e.g., a change in a transfer function) may occur on the received baseband signal, and the baseband signal may be the signal that is processed (e.g., using a Fourier analysis or another type of analysis) to detect movement. In other examples, the processed signal may be an RF signal or another signal.

In some implementations, statistical parameters may be determined for frequency response signals based on wireless signals received by wireless sensor devices (e.g., wireless devices 102A, 102B or motion detection device 104 of FIG. 1A). The statistical parameter may describe a characteristic of the frequency response signals, and may be based on a function applied to frequency components of the frequency response signals over a time segment. In some instances, the statistical parameter includes one or more of at least one of the maximum, minimum, mean, or standard deviation of one or more frequency components of the frequency response signals.

In some implementations, a frequency response signal H based on the received signal R at a wireless sensor device is represented by the vector $$\vec{H}_j = (h_{1,j}, h_{2,j}, h_{3,j}, \ldots, h_{n,j}). \tag{6}$$

The elements of the vector $\vec{H}_j$ are frequency components for respective frequency values $\omega_1, \omega_2, \omega_3, \ldots, \omega_n$ at a time point j. Functions can be defined and applied to the frequency response signal H or to certain frequency components $h_{i,j}$ of the frequency response signal to yield statistical parameters that describe characteristics of the frequency response signal. The statistical parameter can be computed, for example, based on a statistical function or other type of mathematical function that indicates a characteristic of the frequency response signal.

For example, in some instances, the vector $$\vec{\Delta}_j = \vec{H}_j - \vec{H}_{j-1} \tag{7}$$

can be determined for multiple time segments $\Delta t = t_j - t_{j-1}$ of a time period T. For example, the vector $\vec{\Delta}_j$ may be determined for time segments of duration $\Delta t = 0.1$ seconds over a time period of T=60 seconds (s). A function can then be applied to the vector (or elements thereof) to yield values of one or more statistical parameters for the respective time segments. For example, the statistical parameter may be based on a function that determines a maximum of the vector $\vec{\Delta}_j$, such as, for example the maximum value function $$\max_j = \max(|\vec{\Delta}_j|). \tag{8}$$

As another example, the statistical parameter may be based on a function that determines a minimum of the vector $\vec{\Delta}_j$, 0 such as, for example, the minimum value function $$\min_j = \min(|\vec{\Delta}_j|). \tag{9}$$

In some implementations, the statistical parameter is based on a magnitude vector $$\vec{\Delta}_{mag,j} = (|\vec{\Delta}_{1,j}|, |\vec{\Delta}_{2,j}|, |\vec{\Delta}_{3,j}|, \ldots, |\vec{\Delta}_{n,j}|). \tag{10}$$

For example, the vector $\vec{\Delta}_{mag,j}$ may be used to determine a mean, such as, for example, according to the mean value function $$\text{mean}_j = \frac{\sum_{i=1}^{n} \Delta_{mag,i,j}}{N}. \tag{11}$$

As another example, the vector $\vec{\Delta}_{mag,j}$ may be used to determine a standard deviation, such as, for example, according to the standard deviation function:

$$std_j = \sqrt{\frac{\sum_{i=1}^{n} (\Delta_{mag,i,j} - \text{mean})^2}{N-1}} \tag{12}$$

In some cases, distinct categories of motion produce distinct patterns of values in the statistical parameters over time. For example, certain categories of motion may produce a set of values that repeat over time, a set of values that have a relatively high or low correlation with one another, or a range of values not seen with other categories of motion. As another example, certain categories of motion (e.g., a door opening in a space) may produce a set of values with high mean and standard deviation values. Accordingly, the distinct patterns can be used as signatures that indicate which category of motion occurred in the space during a particular time period. The categories of motion can be learned over time. For instance, values for different statistical parameters over a time period can be plotted against each other or otherwise compared to identify trends that can be used to categorize motion occurring in a space. For example, when there is a fan functioning in a space, the vector $\vec{H}_j$ and the components within may be periodic in nature or may rotate among certain values over time. Statistical parameters associated with the vector $\vec{H}_j$ may thus have unique characteristics or patterns associated therewith (e.g., relatively constant values for the mean over different time segments). How the vector $\vec{H}_j$ changes over time can also be indicative of a category of motion. For example, if the vector $\vec{H}_j$ becomes orthogonal over time (the vector $\vec{H}_j$ is orthogonal to the vector $\vec{H}_{j-1}$, and the dot product $\vec{H}_j \cdot \vec{H}_{j-1} = 0$), the change in the vector $\vec{H}_j$ can indicate a large amount of motion in a space. In some implementations, machine learning can be applied to the vector $\vec{H}_j$ or functions applied thereto (e.g., statistical functions) to identify and associate characteristics of the vector $\vec{H}_j$ or the functions with different categories of motion (e.g., motion by a fan vs. a dog vs. a person). For example, in some instances, statistical parameters values may be passed through a neural network (e.g., the GOOGLE CLOUD ML platform) to learn distinct patterns in the values.

FIGS. 4A-4D are plots showing example data for statistical parameters of frequency response signals. The data points of each example plot shown in FIGS. 4A-4D represent values for two statistical parameters: a standard deviation according to Equation (12) on the horizontal axis and a mean according to Equation (11) on the vertical axis. In the example plots shown in FIGS. 4A-4D, each data point value is normalized to values between zero (0) and one (1) based the equation:

$$\text{Normalized}(x_i) = \frac{x_i - \min(X)}{\max(X) - \min(X)} \tag{13}$$

where $x_i$ represents a particular value in the set of values $X=(x_1, x_2, x_3 \ldots x_n)$ for i=1 to n. In the examples plots shown in FIGS. 4A-4D, the values are based on frequency response signals, which are based on wireless signals transmitted through a space during a time period and received at a wireless sensor device. The values for the data points in each example plot are determined from wireless signals transmitted through the space during different respective time periods. In particular, the data points 403 in FIG. 4A were determined from wireless signals transmitted during a first time period, the data points 405 in FIG. 4B were determined from wireless signals transmitted during a second time period, the data points 407 in FIG. 4C were determined from wireless signals transmitted during a third time period, and the data points 409 in FIG. 4C were determined from wireless signals transmitted during a fourth time period.

Figure 4A:
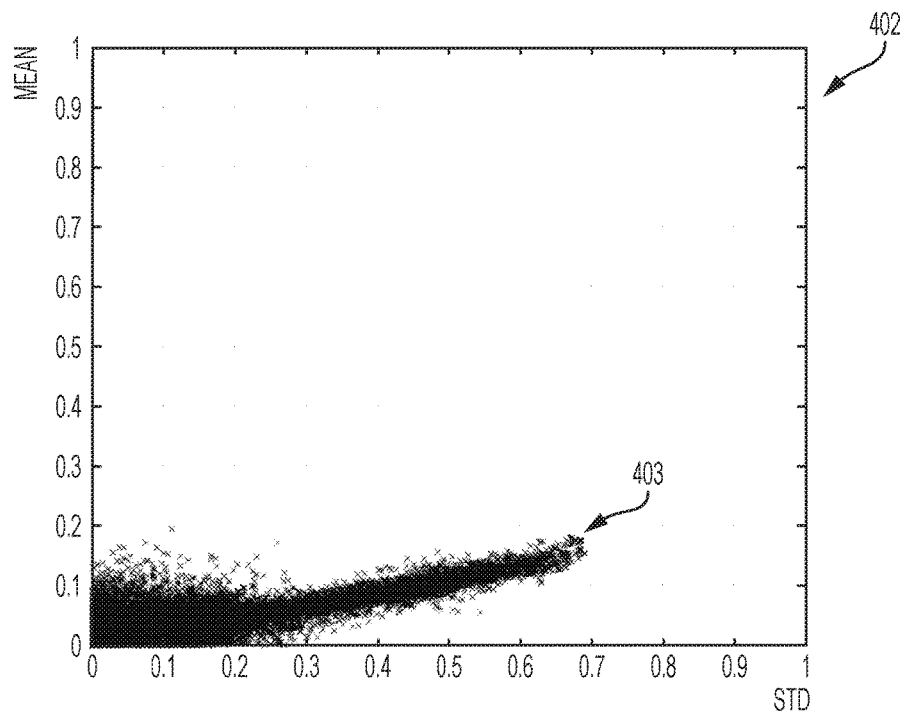
FIGS. 4A-4D are plots showing example data for statistical parameters of frequency response signals.

FIG. 4A shows a plot 402 of example data points 403 relating to motion of an electrical fan (e.g., fan 107 of FIG. 1A) in a space. As shown in FIG. 4A, the data points 403 have a relatively low mean value and are distributed across a wide range of standard deviation values. In addition, the mean and standard deviation values have a relatively high correlation with one another. The example pattern shown (e.g., correlated values of mean and standard deviation) may be identified only when there is motion by the electrical fan in the space, and may accordingly be associated with a distinct category of motion (e.g., a category of motion for inorganic objects generally, or a category of motion for electrical fans specifically) in a motion detection database.

Figure 4B:
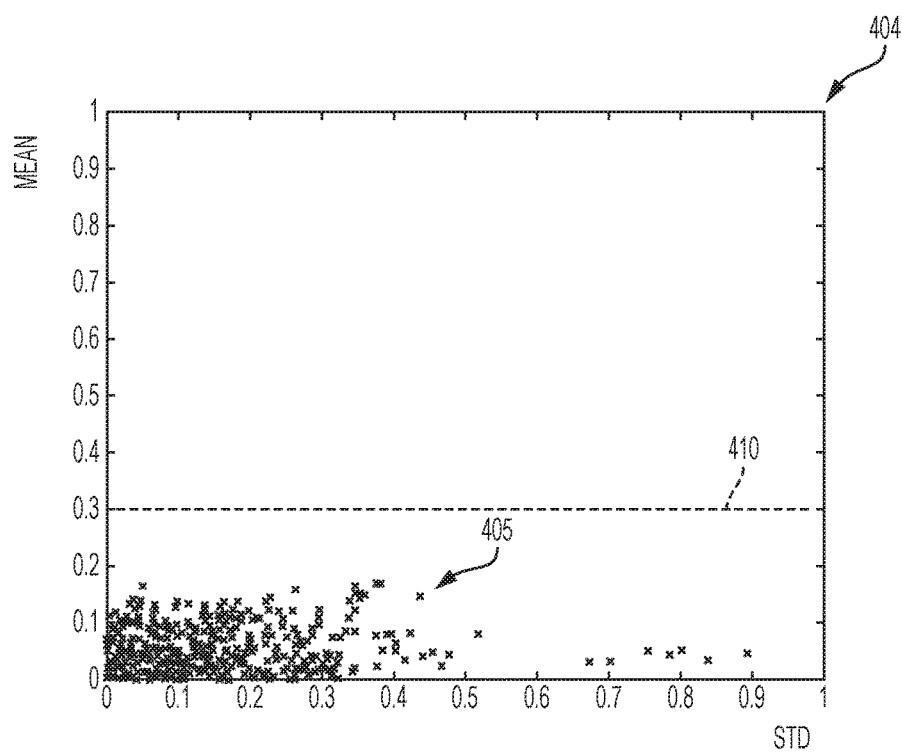

FIG. 4B shows a plot 404 of example data points 405 relating to motion of an animal (e.g., the dog 108 of FIG. 1A) in the space. As shown in FIG. 4B, the data points 405 are generally below a threshold value (e.g., the threshold 410 at the normalized mean value of 0.3 as shown in FIG. 4B) and are distributed non-uniformly across the range of standard deviation values plotted, with many values being in the lower end of the normalized range of values (e.g., below the normalized value of 0.5). The mean and standard deviation values for the data points 405 have a relatively low correlation with one another, especially when compared to the mean and standard deviation values for the data points 403 in FIG. 4A. This pattern of values (e.g., the general range of values observed for the mean or standard deviation (most values being below certain thresholds), or low correlation between the mean and standard deviation values) may be identified when there is motion by the animal in the space without other objects, and may accordingly be associated with a distinct category of motion (e.g., a category of motion for animals generally, or a category of motion for dogs specifically) in a motion detection database.

Figure 4C:
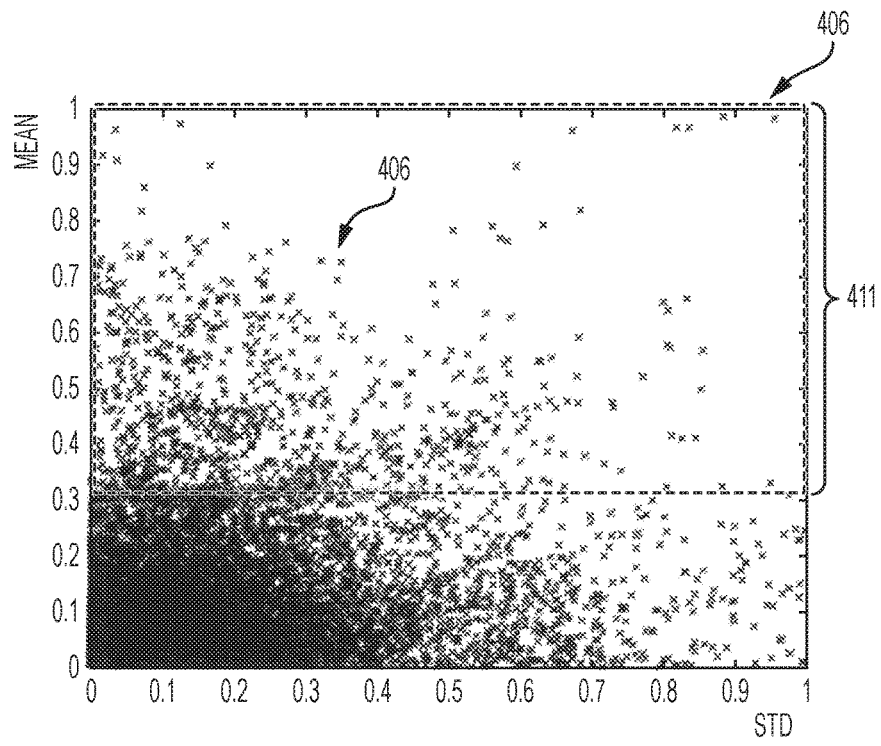

In contrast to the plot 405 of FIG. 4B, FIG. 4C shows a plot 406 of example data points 407 relating to motion of a human (e.g., the person 106 of FIG. 1A) in the space. As shown in FIG. 4C, the data points 407 are distributed non-uniformly and have a larger range and distribution of mean and standard deviation values than the data points 405 of FIG. 4B. This pattern of values (e.g., values for the mean being within the range 411) may be identified when there is motion by the human in the space, and may accordingly be associated with a distinct category of motion (e.g., a category of motion for humans) in a motion detection database.

Figure 4D:
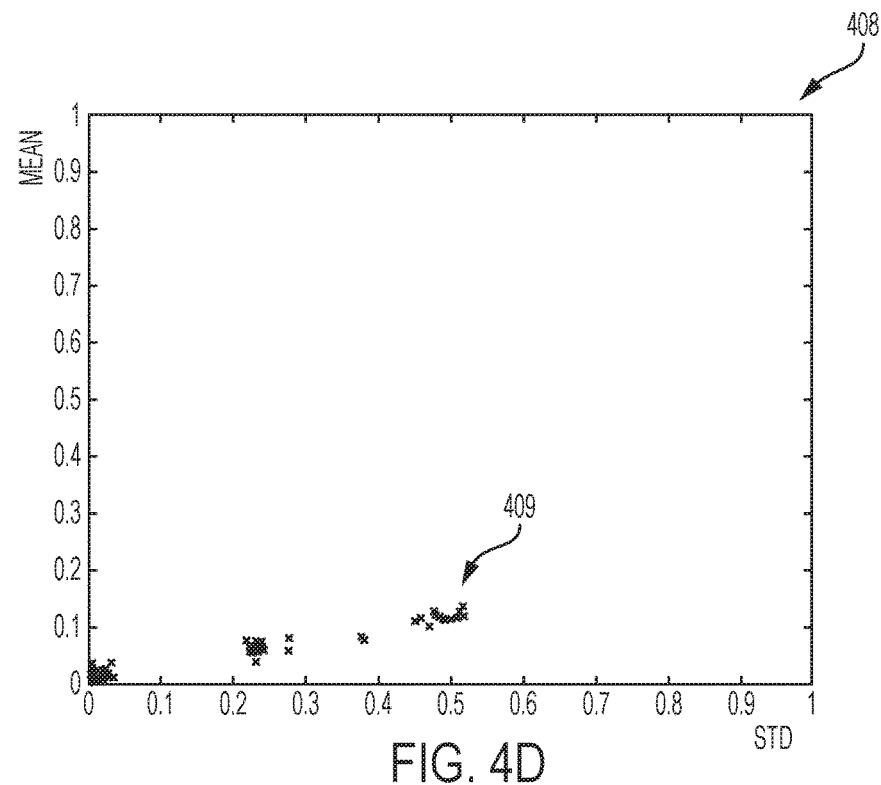

FIG. 4D shows a plot 408 of example data points 409 relating to radio interference and no motion by an object in the space. As shown in FIG. 4D, the data points 409 are distributed non-uniformly across the range of normalized mean and standard deviation values. Because the data points 409 have no identifiable pattern, no association with a distinct category of motion may be made in a motion detection database.

Figure 5:
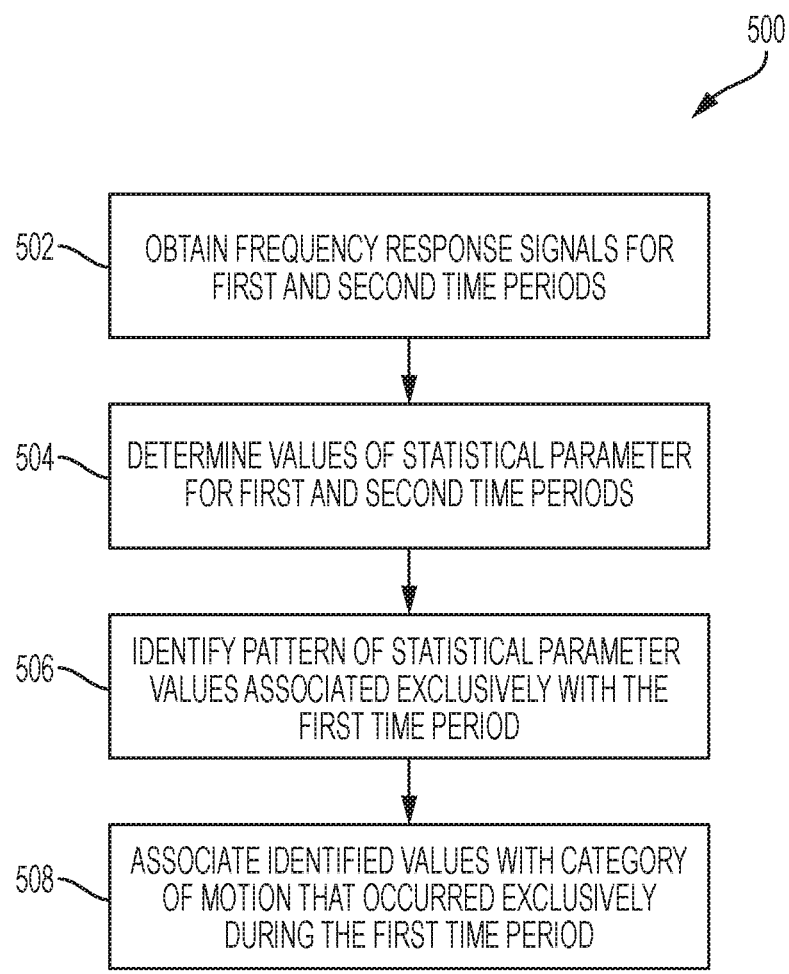
FIG. 5 is a flow diagram showing an example process for associating categories of motion with statistical parameters of frequency response signals.

FIG. 5 is a flow diagram showing an example process 500 for associating categories of motion with statistical parameters of frequency response signals. For instance, operations in the example process 500 may be performed by the processor subsystem 114 of the example motion detector device 104 in FIG. 1A to identify signatures of certain categories of motion (e.g., motion of the person 106 vs. fan 107, dog 108, or another type of object) based on frequency response signals derived from wireless signals from one or both of the wireless devices 102A, 102B. The example process 500 may be performed by another type of device. The example process 500 may include additional or different operations, and the operations may be performed in the order shown or in another order. In some cases, one or more of the operations shown in FIG. 5 are implemented as processes that include multiple operations, sub-processes or other types of routines. In some cases, operations can be combined, performed in another order, performed in parallel, iterated, or otherwise repeated or performed another manner.

At 502, frequency response signals are obtained. In some implementations, the frequency response signals are based on wireless signals transmitted through a space (e.g., by a wireless device 102 of FIG. 1A) and received at a wireless sensor device (e.g., the motion detector device 104 of FIG. 1A). Further, in some implementations, a first subset of the wireless signals are transmitted through the space during a first time period $T_1$ and a second subset of the wireless signals are transmitted through the space during a second time period $T_2$. The frequency response signals may include vectors whose elements are distinct frequency components of a wireless signal received at a particular point in time j. For example, the frequency response signal may be a vector similar to the vector $\vec{H_j}$ in Equation (6). The frequency response signals may be obtained at 502 by retrieving the frequency response signals from a memory, by directly receiving the frequency response signals from the wireless sensor device (e.g., received from a baseband chip of a modem in the wireless sensor device), or in another manner. In some instances, the frequency response signals are obtained from multiple distinct wireless sensor devices. The multiple distinct wireless sensor devices may be located geographically apart from one another, and the frequency response signals may be gathered at a server or other computing device communicatively coupled to each of the distinct wireless sensor devices.

At 504, values of a statistical parameter for first and second time periods are determined. In some implementations, the statistical parameter for the respective time periods is based on a first function applied to frequency components of the subset of frequency response signals associated with the time period. The statistical parameter may include a maximum, minimum, mean, or standard deviation of one or more frequency components of the frequency response signals. For example, the statistical parameter may be based on the functions provided in Equations (11) and (12). In some implementations, each value of the statistical parameter is determined for a respective time segment within the first and second time periods. For example, the statistical parameter may be the mean determined for a particular time segment $\Delta t = t_j - t_{j-1}$ in the time periods $T_1$ or $T_2$. The duration of the time segment may be the same for each determined value, and example values for the time segment include $\Delta t = 0.1$ seconds (s), $\Delta t = 0.5$ seconds (s), or another duration.

The duration of the time periods $T_1$ and $T_2$ may be the same or different as one another, and example durations for the time periods $T_1$ or $T_2$ include 10 seconds (s), 60 seconds (s), or another duration.

In some implementations, values for an additional statistical parameter may be determined at 504. The additional statistical parameter for the respective time periods is based on a second function applied to frequency components of the subset of frequency response signals associated with the time period. For example, in some implementations, values of both the mean and the standard deviation are determined for the first and second time periods. For instance, in the example plots shown in FIGS. 4A-4C, the plotted data points include values of both the mean and the standard deviation determined for time segments within three respective time periods.

At 506, a pattern of values of the statistical parameter associated exclusively with the first time period is identified. The identified pattern may include a range of values (e.g., values above a threshold, values below a threshold, or values between two thresholds), a correlation between values, a repeating set of values, or another type of pattern. In some implementations, for example, a range of values is identified by comparing the values determined for the first period with the values determined for the second period. For instance, referring to the examples shown in FIGS. 4B and 4C, the values for the mean in the range 411 may be identified exclusively in the plot 406 of FIG. 4C and not in the plot 404 of FIG. 4B. As another example, in some implementations, a high correlation factor for mean and standard deviation values is identified. For instance, referring to the example shown in FIG. 4A, the values for the mean have a relatively high correlation with one another. In some implementations, a statistical analysis is used to detect patterns in the statistical parameter values over time. For example, it may be determined that a category of motion for animals produces a substantial portion (as determined by a percentile analysis) of the values for the mean or standard deviation that fall within certain ranges (with some outliers).

At 508, the pattern of values identified at 506 is associated with a category of motion that occurred exclusively during the first time period. The category of motion may indicate motion by a particular type of object. For instance, referring to the example shown in FIG. 4C, the range of values 411 for the mean may be associated with motion by a human, since those values are found exclusively within the time period represented by the data of FIG. 4C and not the time periods represented by the data of FIGS. 4A, 4B, and 4D. In some implementations, associating a category of motion that occurred exclusively during the first time period includes associating the range of values identified at 506 in a motion detection database. For example, referring again to the example shown in FIG. 4C, the range of values 411 may be linked or otherwise associated with an entry in the motion detection database indicating the category of motion indicating motion by a human in the space.

Accordingly, when values within the range are found in another time period, entries of the motion detection database may be consulted and a category of motion may be identified. For instance, after associating the range of values 411 with the category of motion relating to humans, the motion detection database may be used to identify that the category of motion relating to humans occurred in the space during a third time period based on additional wireless signals transmitted through the space during the third time period.

In some implementations, motion data or other information indicating a presence of a moving object in a space during the first time period is obtained. Such motion data may be used at 508 in associating the range of values identified at 506 with a category of motion. Referring to the examples shown in FIG. 4A-4C, for example, the motion data may indicate the type of motion occurring in the space during the respective time period. For example, geolocation information associated with a person (e.g., from global positioning system (GPS) information or another type of geolocation information) may be used to identify that there was motion by a human in a space during the time period represented by FIG. 4C. As another example, a user may set the motion detector device to "pet mode" when humans are not expected to be home, but pets are. The data points for each time period may further include a third value (in addition to the values of the standard deviation and mean statistical values) that indicates the category of motion known to be occurring in the space during the first time period. The third values may be used in analyses to determine signatures of categories of motion (e.g., when comparing values for different time periods with one another). In some implementations, the motion data indicating the type of motion is received separate from motion data received by the wireless sensor device during a particular time period. For instance, information indicating a type of motion in the space during a first time period may be received after wireless signals are received at the wireless sensor device during the first time period.

Figure 6:
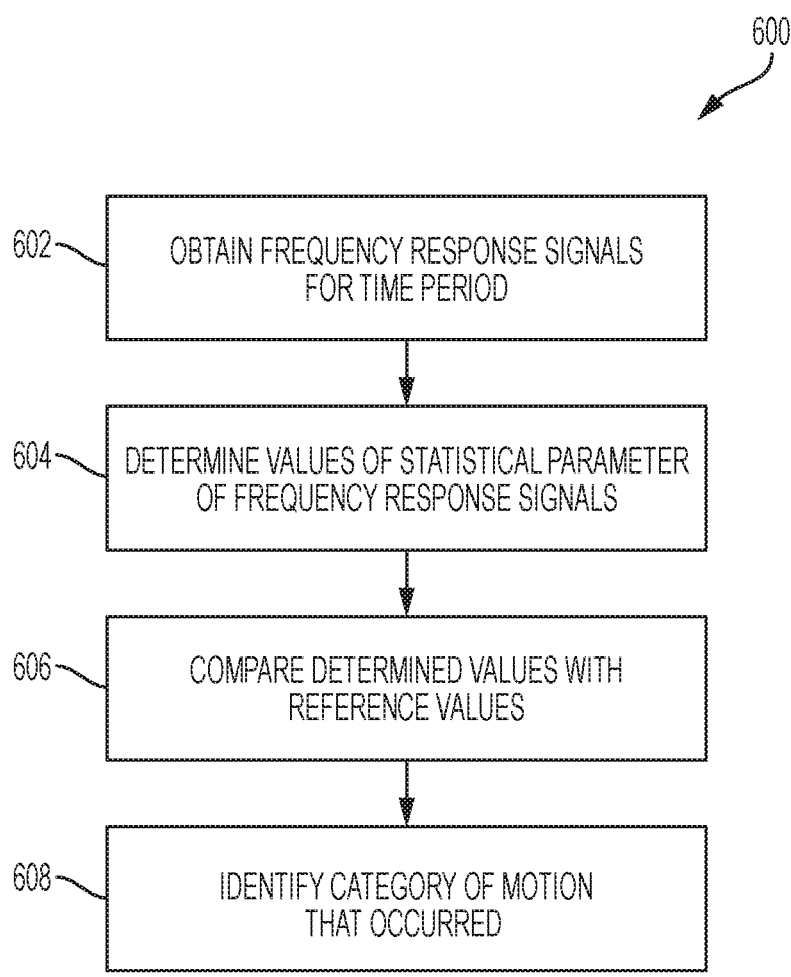
FIG. 6 is a flow diagram showing an example process for identifying a category of motion based on statistical parameters of received frequency response signals.

FIG. 6 is a flow diagram showing an example process 600 for identifying a category of motion based on statistical parameters of received frequency response signals. For instance, operations in the example process 600 may be performed by the processor subsystem 114 of the example motion detector device 104 in FIG. 1A to detect motion of the person 106 (vs. another type of object) based on frequency response signals derived from wireless signals from one or both of the wireless devices 102A, 102B. The example process 600 may be performed by another type of device. The example process 600 may include additional or different operations, and the operations may be performed in the order shown or in another order. In some cases, one or more of the operations shown in FIG. 6 are implemented as processes that include multiple operations, sub-processes, or other types of routines. In some cases, operations can be combined, performed in another order, performed in parallel, iterated, or otherwise repeated or performed another manner.

At 602, frequency response signals are obtained for a time period. In some implementations, the frequency response signals are based on wireless signals transmitted through a space over a time period T and received at a wireless sensor device. Referring to the example shown in FIG. 1A, for instance, the frequency response signals may be based on a wireless signal transmitted by one (or both) of wireless device 102A or 102B, and at motion detector device 104. The signals received by the wireless sensor device may include motion channel packets (e.g., similar to the motion channel packet 202 of FIG. 2), and the payload of the motion channel packets may include information upon which the frequency response signals are based. In some implementations, the frequency response signals include vectors whose elements are distinct frequency components of a wireless signal received at a particular point in time j. For example, the frequency response signal may be a vector similar to the vector $\vec{H}_j$ in Equation (6). The frequency response signals may be obtained at 602 by retrieving the frequency response signals from a memory, or by directly receiving the frequency response signals from a component of the wireless sensor device (e.g., received from a baseband chip of a modem in the wireless sensor device).

At 604, values of a statistical parameter are determined for the time period. In some implementations, the statistical parameter is based on a function applied to frequency components of the frequency response signals obtained at 602. The statistical parameter can be the maximum, minimum, mean, standard deviation, or another statistical component of one or more frequency components of the frequency response signals. For instance, the statistical parameter may be based on the functions in Equations (11) and (12). In some implementations, the values of the statistical parameter are determined for respective time segments within the time period. For instance, the statistical parameter may be the mean described above in Equation (11), and each value of the mean may be determined for a particular time segment $\Delta t = t_j - \Delta_{j-1}$ in the time period T. For example, values of a mean may be determined for time segments of $\Delta t = 0.1$ seconds (s) over a time period of T=10 seconds (s), for time segments of $\Delta t = 0.5$ seconds (s) over a time period of T=60 seconds (s), or for different time segments over a different time period.

At 606, the values determined at 604 are compared with reference values. The reference values may include ranges of values for the statistical parameter previously identified in a motion learning phase (e.g., the process 500 of FIG. 5), and the ranges of values may be associated with particular categories of motion (e.g., motion by a fan, a dog, or a person). In some implementations, the reference values are entries in a motion detection database that associate distinct categories of motion with respective ranges of values for the statistical parameter. For example, referring to the example shown in FIG. 4C and described above, a category of motion relating to motion by a human may be associated with the range of values 411 for the mean statistical value found during the third time period represented by the data points 407. The reference values in the motion detection database may also indicate other types of patterns of values for a statistical parameter seen exclusively for a particular category of motion. For example, referring to the example shown in FIG. 4A, a category of motion relating to motion by a fan (or more generally, an inorganic object) may be associated with values for the mean and standard deviation being highly correlated.

At 608, a category of motion that occurred during the time period is identified. In some implementations, the category of motion is identified based on the comparison at 606. For example, based on the comparison at 606, the reference values may be found to be linked or otherwise associated with a category of motion in a motion detection database. In some implementations, after the category of motion has been identified, an action or programmed response may be taken. For example, a computing device (e.g., the motion detector device 104 of FIG. 1A) may activate a security alert (e.g., send an alert to security personnel, to a homeowners' mobile phone, or to another device), activate lighting or HVAC in the location where motion was detected (e.g., in a room, a hallway, or outdoors), or perform a combination of these or other types of programmed responses.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., non-magnetic drives (e.g., a solid-state drive), magnetic disks, magneto optical disks, or optical disks. However, a computer need not have such devices. Moreover, a computer can be embedded in another device, e.g., a phone, a tablet computer, an electronic appliance, a mobile audio or video player, a game console, a Global Positioning System (GPS) receiver, an Internet-of-Things (IoT) device, a machine-to-machine (M2M) sensor or actuator, or a portable storage device (e.g., a universal serial bus (USB) flash drive). Devices suitable for storing computer program instructions and data include all forms of non-volatile memory, media, and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a stylus, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. The communication network may include one or more of a local area network ("LAN") and a wide area network ("WAN"), an inter-network (e.g., the Internet), a network that includes a satellite link, and peer-to-peer networks (e.g., ad hoc peer-to-peer networks). A relationship of client and server may arise by virtue of computer programs running on the respective computers and having a client-server relationship to each other.

In a general aspect of the examples described, motion detected using wireless signals is categorized.

In a first example, frequency response signals based on wireless signals transmitted through a space during a time period and received at a wireless sensor device are obtained. By operation of one or more processors, values of a statistical parameter for the time period are determined. The statistical parameter for the time period is based on a function applied to frequency components of the frequency response signals. A category of motion that occurred in the space during the time period is identified based on the values of the statistical parameter.

Implementations of the first example may, in some cases, include one or more of the following features. The statistical parameter may include at least one of the maximum, minimum, mean, or standard deviation of the frequency components. Identifying a category of motion may include comparing the values of the statistical parameter with reference values of the statistical parameter. The reference values of the statistical parameter may include entries in a motion detection database that associates distinct categories of motion with respective patterns of values of the statistical parameter.

Implementations of the first example may, in some cases, include one or more of the following features. A pattern in the values of the statistical parameter may be determined by operation of one or more processors, and a category of motion that occurred in the space during the time period may be identified based on the pattern. The pattern in the values of the statistical parameter may include a range of values, a correlation between values, or a periodically repeating sequence of values.

Implementations of the first example may, in some cases, include one or more of the following features. The statistical parameter may be a first statistical parameter based on a first function applied to frequency components of the frequency response signals. Values of a second statistical parameter of the frequency response signals may be determined by operation of one or more processors. The second statistical parameter may be based on a second function applied to frequency components of the frequency response signals. The category of motion that occurred in the space during the time period may be identified based on the values of the first statistical parameter and the values of the second statistical parameter.

In a second example, frequency response signals based on wireless signals transmitted through a space and received at a wireless sensor device are obtained. A first subset of the frequency response signals is associated with a first time period and are based on wireless signals transmitted through the space during the first time period. A second subset of the of the frequency response signals is associated with a second, different time period and are based on wireless signals transmitted through the space during the second time period. By operation of one or more processors, values of a statistical parameter for the first and second time periods are determined. The values of the statistical parameter for each time period are determined based on a function applied to frequency components of the subset of frequency response signals associated with the time period. Out of the values of the statistical parameter for the first and second time periods, a pattern of the values associated exclusively with the first time period is identified, and the pattern of the values is associated, in a motion detection database, with a category of motion that occurred in the space exclusively during the first time period.

Implementations of the second example may, in some cases, include one or more of the following features. The category of motion may indicate motion by a particular type of object. Motion data indicating a presence of a moving object in the space exclusively during the first time period may be obtained, and the pattern of values may be associated with the category of motion based on the motion data. After associating the pattern of values with the category of motion, the motion detection database may be used to identify that the category of motion occurred in the space during a third time period based on additional wireless signals transmitted through the space during the third time period.

Implementations of the second example may, in some cases, include one or more of the following features. The category of motion may include a first category, the pattern of values may include a first pattern, and the motion detection database may associate distinct categories of motion with respective patterns of values of the statistical parameter. Identifying the pattern of the values associated exclusively with the first time period may include identifying a range of values associated exclusively with the first time period. Identifying the pattern of the values associated exclusively with the first time period may include identifying a periodically repeating sequence of values associated exclusively with the first time period. Identifying the pattern of the values associated exclusively with the first time period may include identifying a correlation between values associated exclusively with the first time period.

Implementations of the second example may, in some cases, include one or more of the following features. The statistical parameter may be a first statistical parameter based on a first function applied to the frequency components. Values of a second statistical parameter for the first and second time periods may be determined based on the frequency response signals. Out of the values of the second statistical parameter for the first and second time periods, a pattern of values of the first and second statistical parameters associated exclusively with the first time period may be identified. The pattern of the values of the first and second statistical parameters may be associated, in a motion detection database, with the category of motion.

In some implementations, a system includes a data processing apparatus and a computer-readable medium storing instructions that are operable when executed by the data processing apparatus to perform one or more operations of the first example or the second example (or both). In some implementations, a computer-readable medium stores instructions that are operable when executed by a data processing apparatus to perform one or more operations of the first example or the second example or both.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of embodiments have been described. Nevertheless, it will be understood that various modifications can be made. Accordingly, other embodiments are within the scope of the following claims.

What is claimed is:

1. A motion detection method comprising:
obtaining frequency response signals based on wireless signals transmitted through a space during a time period and received at a wireless sensor device;
by operation of one or more processors, determining values of a first statistical parameter for the time period by applying a first function to frequency components of the frequency response signals;
by operation of one or more processors, determining values of a second statistical parameter for the time period by applying a second function to frequency components of the frequency response signals; and
identifying a category of motion that occurred in the space during the time period based on the values of the first and second statistical parameters.

2. The method of claim 1, wherein the first statistical parameter comprises at least one of the maximum, minimum, mean, or standard deviation of the frequency components.

3. The method of claim 1, wherein identifying a category of motion comprises comparing the values of the first and second statistical parameters with reference values of the first and second statistical parameters.

4. The method of claim 3, wherein the reference values of the first and second statistical parameters comprise entries in a motion detection database that associates distinct categories of motion with respective patterns of values of the first and second statistical parameters.

5. The method of claim 1, comprising:
by operation of one or more processors, determining a pattern in the values of the first and second statistical parameters; and
identifying a category of motion that occurred in the space during the time period based on the pattern.

6. The method of claim 5, wherein the pattern in the values of the first and second statistical parameters includes a range of values, a correlation between values, or a periodically repeating sequence of values.

7. The method of claim 1, wherein each value of the first and second statistical parameters is determined for a time segment of the time period.

8. A motion detection method comprising:
obtaining frequency response signals based on wireless signals transmitted through a space and received at a wireless sensor device, a first subset of the frequency response signals associated with a first time period and based on wireless signals transmitted through the space during the first time period, a second subset of the of the frequency response signals associated with a second, different time period and based on wireless signals transmitted through the space during the second time period;
by operation of one or more processors, determining values of a first statistical parameter for the first and second time periods by applying a first function to frequency components of the respective subsets of the frequency response signals;
by operation of one or more processors, determining values of a second statistical parameter for the first and second time periods by applying a second function to frequency components of the respective subsets of the frequency response signals;
identifying, out of the values of the first and second statistical parameters, a pattern of values associated exclusively with the first time period; and
associating, in a motion detection database, the pattern of values with a category of motion that occurred in the space exclusively during the first time period.

9. The method of claim 8, wherein the category of motion indicates motion by a particular type of object.

10. The method of claim 8, comprising obtaining motion data indicating a presence of a moving object in the space exclusively during the first time period, wherein the pattern of values is associated with the category of motion based on the motion data.

11. The method of claim 8, comprising, after associating the pattern of values with the category of motion, using the motion detection database to identify that the category of motion occurred in the space during a third time period based on additional wireless signals transmitted through the space during the third time period.

12. The method of claim 8, wherein the category of motion comprises a first category, the pattern of values comprises a first pattern, and the motion detection database associates distinct categories of motion with respective patterns of values of the statistical parameter.

13. The method of claim 8, wherein identifying the pattern of values associated exclusively with the first time period comprises identifying a range of values associated exclusively with the first time period.

14. The method of claim 8, wherein identifying the pattern of values associated exclusively with the first time period comprises identifying a correlation between values associated exclusively with the first time period.

15. The method of claim 8, wherein each value of the first and second statistical parameters is determined for a time segment of the respective time periods.

16. A system comprising:
a data processing apparatus; and
a non-transitory computer-readable medium storing instructions that are operable when executed by the data processing apparatus to perform operations comprising:
  obtaining frequency response signals based on wireless signals transmitted through a space during a time period and received at a wireless sensor device;
  determining values of a first statistical parameter for the time period by applying a first function to frequency components of the frequency response signals;
  determining values of a second statistical parameter for the time period by applying a second function to frequency components of the frequency response signals; and
  identifying a category of motion that occurred in the space during the time period based on the values of the first and second statistical parameters.

17. The system of claim 16, wherein the first statistical parameter comprises at least one of the maximum, minimum, mean, or standard deviation of the frequency components.

18. The system of claim 16, wherein identifying a category of motion comprises comparing the values of the first and second statistical parameters with reference values of the first and second statistical parameters.

19. The system of claim 18, wherein the reference values of the first and second statistical parameters comprise entries in a motion detection database that associates distinct categories of motion with respective patterns of values of the first and second statistical parameters.

20. The system of claim 16, wherein the operations comprise:
  determining a pattern in the values of the first and second statistical parameters; and
  identifying a category of motion that occurred in the space during the time period based on the pattern.

21. The system of claim 20, wherein the pattern in the values of the first and second statistical parameters includes a range of values, a correlation between values, or a periodically repeating sequence of values.

22. The system of claim 16, wherein each value of the first and second statistical parameters is determined for a time segment of the time period.

23. A system comprising:
a data processing apparatus; and
a non-transitory computer-readable medium storing instructions that are operable when executed by the data processing apparatus to perform operations comprising:
  obtaining frequency response signals based on wireless signals transmitted through a space and received at a wireless sensor device, a first subset of the frequency response signals associated with a first time period and based on wireless signals transmitted through the space during the first time period, a second subset of the of the frequency response signals associated with a second, different time period and based on wireless signals transmitted through the space during the second time period;
  determining values of a first statistical parameter for the first and second time periods by applying a first function to frequency components of the respective subsets of the frequency response signals;
  determining values of a second statistical parameter for the first and second time periods by applying a second function to frequency components of the respective subsets of the frequency response signals;
  identifying, out of the values of the first and second statistical parameters, a pattern of values associated exclusively with the first time period; and
  associating, in a motion detection database, the pattern of values with a category of motion that occurred in the space exclusively during the first time period.

24. The system of claim 23, wherein the category of motion indicates motion by a particular type of object.

25. The system of claim 23, comprising obtaining motion data indicating a presence of a moving object in the space exclusively during the first time period, wherein the pattern of values is associated with the category of motion based on the motion data.

26. The system of claim 23, comprising, after associating the pattern of values with the category of motion, using the motion detection database to identify that the category of motion occurred in the space during a third time period based on additional wireless signals transmitted through the space during the third time period.

27. The system of claim 23, wherein the category of motion comprises a first category, the pattern of values comprises a first pattern, and the motion detection database associates distinct categories of motion with respective patterns of values of the statistical parameter.

28. The system of claim 23, wherein identifying the pattern of values associated exclusively with the first time period comprises identifying a range of values associated exclusively with the first time period.

29. The system of claim 23, wherein identifying the pattern of values associated exclusively with the first time period comprises identifying a correlation between values associated exclusively with the first time period.

30. The system of claim 23, each value of the first and second statistical parameters is determined for a time segment of the respective time periods.

* * * * *